United States Patent
Ouedraogo et al.

(10) Patent No.: US 10,498,017 B2
(45) Date of Patent: Dec. 3, 2019

(54) MINIATURE ULTRA-WIDEBAND MULTIFUNCTIONAL ANTENNAS AND RELATED TECHNIQUES

(71) Applicant: Massachusetts Institute of Technology, Cambridge, MA (US)

(72) Inventors: Raoul Ouatagom Ouedraogo, Lexington, MA (US); Eric Phelps, Bedford, MA (US); Jeremy Muldavin, Lawrence, MA (US); Todd Addison Thorsen, Carlisle, MA (US); Carl O. Bozler, Waltham, MA (US); Christopher Cherry, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 553 days.

(21) Appl. No.: 15/302,053

(22) PCT Filed: Sep. 15, 2015

(86) PCT No.: PCT/US2015/050086
§ 371 (c)(1),
(2) Date: Oct. 5, 2016

(87) PCT Pub. No.: WO2016/044208
PCT Pub. Date: Mar. 24, 2016

(65) Prior Publication Data
US 2017/0194699 A1    Jul. 6, 2017

Related U.S. Application Data

(60) Provisional application No. 62/050,286, filed on Sep. 15, 2014.

(51) Int. Cl.
*H01Q 1/36*    (2006.01)
*H01Q 3/01*    (2006.01)
(Continued)

(52) U.S. Cl.
CPC .............. *H01Q 1/36* (2013.01); *G01J 5/0837* (2013.01); *H01Q 3/01* (2013.01); *H01Q 9/0457* (2013.01);
(Continued)

(58) Field of Classification Search
CPC .. H01Q 1/36; H01Q 3/01; H01Q 3/24; H01Q 3/247; H01Q 9/0457; H01Q 9/28;
(Continued)

(56) References Cited

U.S. PATENT DOCUMENTS 6,476,769 B1    11/2002    Lehtola
8,018,375 B1    9/2011    Alexopoulos et al.
(Continued)

OTHER PUBLICATIONS

PCT Search Report of the ISA for Appl. No. PCT/US2015/050086 dated Dec. 11, 2015.
PCT Written Opinion of the ISA for Appl. No. PCT/US2015/050086 dated Dec. 11, 2015.
PCT International Preliminary Report on Patentability of the ISA for Appl. No. PCT/US2015/050086 dated Mar. 30, 2017; 7 pages.

*Primary Examiner* — Hoang V Nguyen
(74) *Attorney, Agent, or Firm* — Daly, Crowley, Mofford & Durkee, LLP (57) ABSTRACT

Miniature multifunctional antennas and related techniques are disclosed that are capable of wide bandwidth operation. In some embodiments, the antennas are capable of being reconfigured in the field for optimal performance in different frequency band configurations (e.g., a single wide instantaneous bandwidth, multiple smaller bands, etc.) and/or for purposes of self healing. In some embodiments, the antennas can be reconfigured in the field to achieve different polarizations (e.g., vertical, horizontal, circular). The antennas can be implemented in a very compact manner making them ideal for use in devices and platforms where size and weight are a concern.

24 Claims, 10 Drawing Sheets

(51) Int. Cl.
| | |
|---|---|
| *H01Q 9/28* | (2006.01) |
| *H01Q 21/26* | (2006.01) |
| *G01J 5/08* | (2006.01) |
| *H01Q 9/04* | (2006.01) |
| *H01Q 21/06* | (2006.01) |
| *H01Q 25/00* | (2006.01) |

(52) U.S. Cl.
CPC ............. *H01Q 9/28* (2013.01); *H01Q 21/065* (2013.01); *H01Q 21/26* (2013.01); *H01Q 25/002* (2013.01)

(58) Field of Classification Search
CPC .... H01Q 21/061; H01Q 21/065; H01Q 21/26; H01Q 25/002
See application file for complete search history.

(56) References Cited

U.S. PATENT DOCUMENTS

| | | |
|---|---|---|
| 2003/0219035 A1 | 11/2003 | Schmidt |
| 2004/0095288 A1 | 5/2004 | Jackson |
| 2005/0200528 A1 | 9/2005 | Carrender et al. |
| 2007/0273588 A1 | 11/2007 | Kim et al. |
| 2008/0198074 A1 | 8/2008 | Walton et al. |
| 2009/0251357 A1 | 10/2009 | Margomenos |
| 2010/0171675 A1* | 7/2010 | Borja ...................... H01Q 1/38 343/798 |
| 2010/0177012 A1 | 7/2010 | Morrow |
| 2012/0154237 A1 | 6/2012 | Ying |
| 2014/0009349 A1 | 1/2014 | Tatarnikov et al. |

\* cited by examiner

*FIG. 9*

MINIATURE ULTRA-WIDEBAND MULTIFUNCTIONAL ANTENNAS AND RELATED TECHNIQUES

CROSS REFERENCE TO RELATED APPLICATIONS

This application is a U.S. National Stage of PCT application PCT/US2015/050086 filed in the English language on Sep. 15, 2015, and entitled "MINIATURE ULTRA-WIDEBAND MULTIFUNCTIONAL ANTENNAS AND RELATED TECHNIQUES," which claims the benefit under 35 U.S.C. § 119 of provisional application No. 62/050,286 filed Sep. 15, 2014, which application is hereby incorporated herein by reference.

GOVERNMENT RIGHTS

This invention was made with government support under Contract No. FA8721-05-C-0002 awarded by the U.S. Air Force. The government has certain rights in this invention.

FIELD

The subject matter described herein relates generally to antennas and, more particularly, to wideband, multi-functional antennas that are capable of compact implementation.

BACKGROUND

In recent years, there has been an increasing demand for miniature multifunction antennas in both military and commercial applications. There has also been a demand for antennas and other radio frequency (RF) systems that can adapt to changing operational frequency band requirements. While software defined radio (SDR) technologies provide the desired flexibility in the receiver and processing systems, antennas are still largely designed as static devices. As a result, many RF systems include multiple antennas to service different applications or physically large antennas to provide a bandwidth wide enough to cover multiple applications with a single antenna. Both of these solutions require that a relatively large area be provided for antennas. As such, these solutions may not be adequate for use in many systems having limited available space (e.g., handheld devices, unmanned vehicles (aerial, terrestrial, and aquatic), body worn sensors, communication satellites, micro-satellites, avionics systems, wireless access points, wireless network interface devices, cellular base stations, and/or others). In addition, if a desired operating frequency band or other operational parameter later changes, these solutions may require an antenna re-design. As will be appreciated, such redesign efforts are both costly and time consuming.

There is a need for wideband, multi-function antenna structures and techniques that are capable of implementation in a relatively compact area. There is also a need for antenna structures and techniques that are capable of adapting to changing operational requirements.

SUMMARY

The present disclosure relates to miniature multifunctional antenna designs that are capable of achieving wide operational bandwidths from a relatively small antenna. The antennas utilize pixelated radiating structures that can be optimized for size reduction and bandwidth enhancement. In some embodiments, multi-level antennas are provided where one or more higher frequency pixelated radiating structures are implemented on one or more intermediate levels between a lower frequency pixelated radiating structure and a ground plane. Such multilevel structures are capable of providing wider instantaneous bandwidths than a single level antenna with little or no increase in physical size. In some embodiments, antennas are provided that can be reconfigured in the field for optimal operation in different frequency bands and/or different polarizations. Structures and techniques for controllably modifying a pixel topology of an antenna are also provided.

In accordance with one aspect of the concepts, systems, circuits, and techniques described herein, an antenna system comprises: a first pixelated radiating element on a first level; one or more second pixelated radiating elements on a second level, the second level being different from the first level; and a ground plane located below the first and second levels, the ground plane serving as a ground plane for radiating elements on both the first level and the second level, wherein the one or more second pixelated radiating elements fit within an outer boundary of the first pixelated radiating element projected onto the second level.

In one embodiment, the second level is between the first level and the ground plane; the first pixelated radiating element is operative in a first frequency range; and each second pixelated radiating element is operative in a second frequency range that is higher than the first frequency range.

In one embodiment, the antenna system further comprises a controller configured to multiplex feeds associated with the first and second pixelated radiating elements together to achieve a single wideband instantaneous bandwidth for the antenna system that is a combination of the first and second frequency ranges.

In one embodiment, the controller is configured to dynamically select a frequency mode for the antenna system from a group of frequency modes, wherein the group of frequency modes includes at least two of: a mode operative in the first frequency range, a mode operative in the second frequency range, and a mode operative in a wideband frequency range achieved by multiplexing feeds of the first and second pixelated radiating elements together.

In one embodiment, the antenna system further comprises one or more third pixelated radiating elements on a third level, the third level being between the second level and the ground plane, wherein each third pixelated radiating element is operative in a third frequency range that is higher than the second frequency range.

In one embodiment, the upper band edge of the first frequency range is approximately the same as the lower band edge of the second frequency range.

In one embodiment, the first pixelated radiating element is optimized to achieve small size and wide bandwidth; and the one or more second pixelated radiating elements are scaled versions of the first pixelated radiating element.

In one embodiment, the antenna system further comprises a third pixelated radiating element on the first level that is orthogonally oriented with respect to the first pixelated radiating element.

In one embodiment, the antenna system further comprises one or more fourth pixelated radiating elements on the second level, wherein each of the fourth pixelated radiating elements is orthogonally oriented with respect to a corresponding second pixelated radiating element.

In one embodiment, the antenna system further comprises a controller to select one of multiple polarization modes for the antenna system and to couple feeds of radiating elements on the first and second levels in a manner that supports the selected polarization mode, wherein the multiple polarization modes include at least two of: a vertical polarization mode, a horizontal polarization mode, a left hand circular polarization mode, and a right hand circular polarization mode.

In one embodiment, the first pixelated radiating element includes a plurality of adjustable pixels that can each be individually changed between multiple pixel states in response to one or more control signals; each of the second pixelated radiating elements includes a plurality of adjustable pixels that can each be individually changed between multiple pixel states in response to one or more control signals; and the antenna system further comprises a controller configured to: (a) provide control signals to the adjustable pixels of the first pixelated radiating element to modify a response of the first pixelated radiating element and (b) provide control signals to the adjustable pixels of the second pixelated radiating elements to modify responses of the second pixelated radiating elements.

In one embodiment, the controller is configured to adapt a pixel geometry of the first pixelated radiating element and a pixel geometry of the at least one second pixelated radiating element based on requirements of one or more applications currently being performed by the antenna, wherein the applications being performed can change with time.

In one embodiment, at least one of the pixelated radiating elements on the first and second levels includes one or more adjustable pixels having a conductive pixel element and a plurality of electronic switching devices coupled between the conductive pixel element and conductive pixel elements associated with adjacent adjustable pixels.

In one embodiment, at least one of the pixelated radiating elements on the first and second levels includes one or more adjustable pixels having a reservoir of a liquid conductive material coupled to a pixel chamber, wherein the adjustable pixel is activated by applying pressure to the reservoir to force the liquid conductive material into the pixel chamber.

In one embodiment, the controller is configured to adjust pixel geometries of pixelated radiating elements on the first and second levels to achieve optimized operation within a selected one of: a single narrow frequency band, multiple frequency bands, or a single wide frequency band.

In one embodiment, the antenna system further comprises: at least one sensor to measure a performance metric of the antenna; and a controller configured to determine new pixel geometries for the first and second pixelated radiating elements in the field based at least in part on readings of the at least one sensor.

In accordance with another aspect of the concepts, systems, circuits, and techniques described herein, an antenna system comprises: a first pixelated radiating element on a first level, the first pixelated radiating element having a plurality of adjustable pixels that can each be individually changed between multiple pixel states in response to one or more control signals; at least one second pixelated radiating element on a second level, the at least one second pixelated radiating element having a plurality of adjustable pixels that can each be individually changed between multiple pixel states in response to one or more control signals; and a ground plane located below the first and second levels, the ground plane serving as a ground plane for radiating elements on both the first level and the second level, the second level being located between the first level and the ground plane, wherein the at least one second pixelated radiating element fits within an outer boundary of the first pixelated radiating element projected onto the second level.

In one embodiment, the antenna system further comprises a controller configured to determine new pixel geometries for one or more of the first pixelated radiating element and the at least one second pixelated radiating element in the field to support optimized operation within one or more frequency ranges not currently supported by the antenna system.

In one embodiment, the antenna system further comprises a controller configured to: (a) identify a degraded response of one or more of the first and second pixelated radiating elements during antenna operation; and (b) determine a new pixel geometry for each radiating element having a degraded response to improve the response of the radiating element.

In one embodiment, the adjustable pixels of the first and second pixelated radiating elements include at least one adjustable pixel having a conductive pixel element and a plurality of electronic switching devices coupled between the conductive pixel element and conductive pixel elements associated with adjacent adjustable pixels.

In one embodiment, the adjustable pixels of the first and second pixelated radiating elements include at least one adjustable pixel having a reservoir of a liquid conductive material coupled to a pixel chamber, wherein the adjustable pixel is activated by applying pressure to the reservoir to force the liquid conductive material into the pixel chamber.

In one embodiment, the edges of the first and/or second pixelated radiating layers are shorted to the ground using shorting posts or a shorting plate or other shorting structure.

In one embodiment, a layer of artificially constructed material such as a metamaterial or magnetic composite is disposed below the second layer to achieve resonance at an even lower frequency.

In one embodiment, the edges of the first and/or second pixelated radiating layers are connected to shorting pins or shorting plates or other shorting structure(s) through resistors.

BRIEF DESCRIPTION OF THE DRAWINGS

The foregoing features may be more fully understood from the following description of the drawings in which.

DETAILED DESCRIPTION

In the description that follows, various features, concepts, and techniques are described in the context of a bowtie antenna above ground. It should be appreciated that these features, concepts, and techniques may also be used with other types of planar or conformal radiating structures and surfaces.

Figure 1:
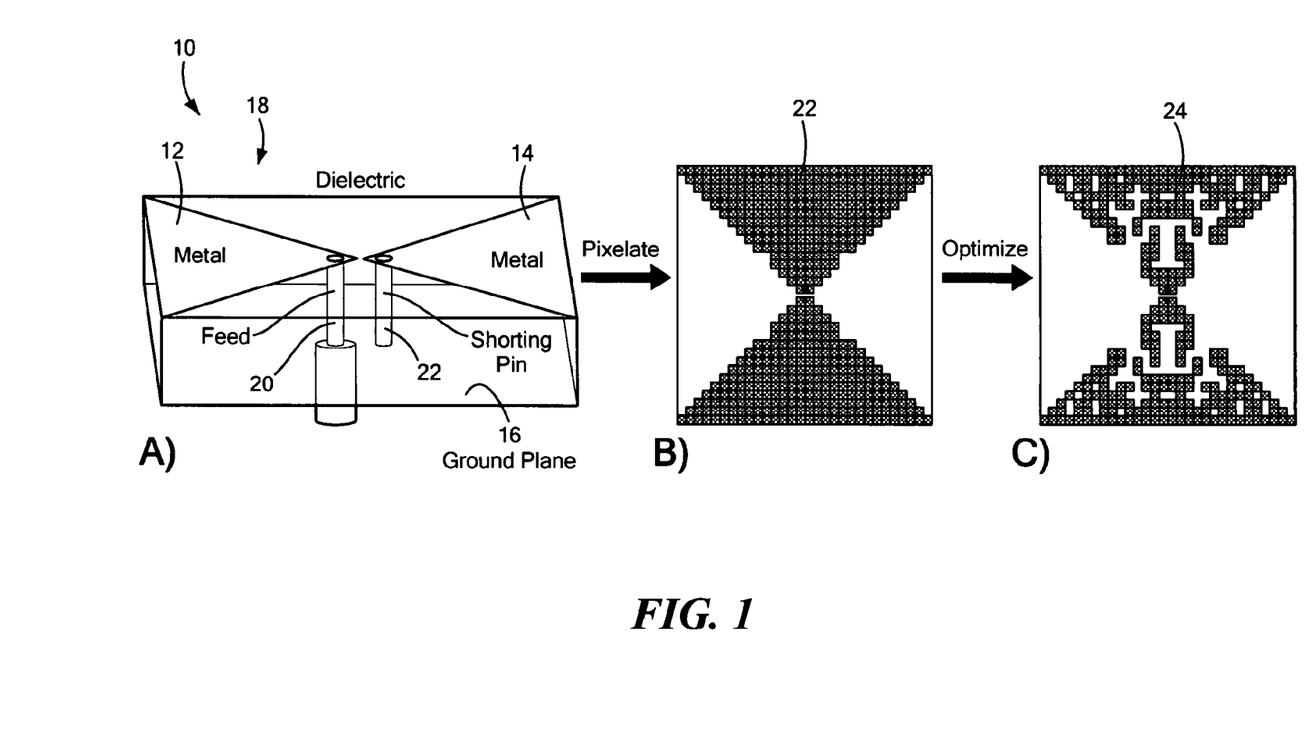
FIG. 1 is a diagram illustrating an antenna aperture optimization technique that may be used in one or more embodiments.

FIG. 1 is a diagram illustrating an antenna aperture optimization technique that may be used in one or more embodiments described herein. As shown, a conventional bowtie antenna 10 may include two triangular bowtie metallization regions 12, 14 spaced above a ground plane 16. The bowtie metallization regions 12, 14 act as the radiating surfaces of the antenna. A dielectric layer 18 may separate the bowtie metallization regions 12, 14 from the ground plane 16. A radio frequency (RF) feed 20 may extend through the ground plane 16 to feed one of the bowtie regions (i.e., region 12) near a central portion of the bowtie. A shorting pin 22 may be coupled between the ground plane 16 and the other bowtie region 14, also near the central portion of the bowtie. As part of an antenna aperture optimization technique, the bowtie regions 12, 14 (i.e., the radiating surfaces) may be parameterized into a multitude of pixels 22. That is, these radiating surfaces may be divided into a large number of small elements having known locations and shapes.

An optimization process may then be performed that is intended to determine an optimal state for each of the pixels 22 to achieve one or more predetermined design goals for the antenna (e.g., wide bandwidth with small antenna size, etc.). Each of the pixels may have two or more different states. In a binary pixel embodiment, for example, each pixel will have two possible states, one where the pixel includes metallization and another where it does not. The optimization process may be used to determine an overall pixel topology for the antenna that optimally or near optimally achieves the design goals of the antenna. Various different optimization strategies may be used to arrive at an optimized pixel topology. An optimized bowtie 24 is shown on the right in FIG. 1.

In general, parameterizing a bowtie into N pixels produces $p^N$ different antenna geometries, where p is the number of topologies or states associated with each pixel. The topology of a pixel may be altered by varying the dimensions of the pixel (e.g., changing length and/or width) or by turning the pixel ON and OFF. For example, an antenna parameterized into 40 binary pixels (ON-OFF states) leads to $2^{40}$ or over 1 trillion antenna geometries. Techniques may be used to identify an optimal or near optimal geometry for the antenna for achieving desired design goals. In at least one embodiment, a genetic algorithm is used to identify an optimal or near optimal geometry. Other optimization techniques may alternatively be used. In some embodiments, once an optimized pixel geometry has been decided upon, radiators having that optimized geometry may then be fabricated. However, in some embodiments, as will be described in greater detail, configurable pixelated antenna structures are provided that allow an optimized pixel geometry to be achieved in situ.

Figure 2:
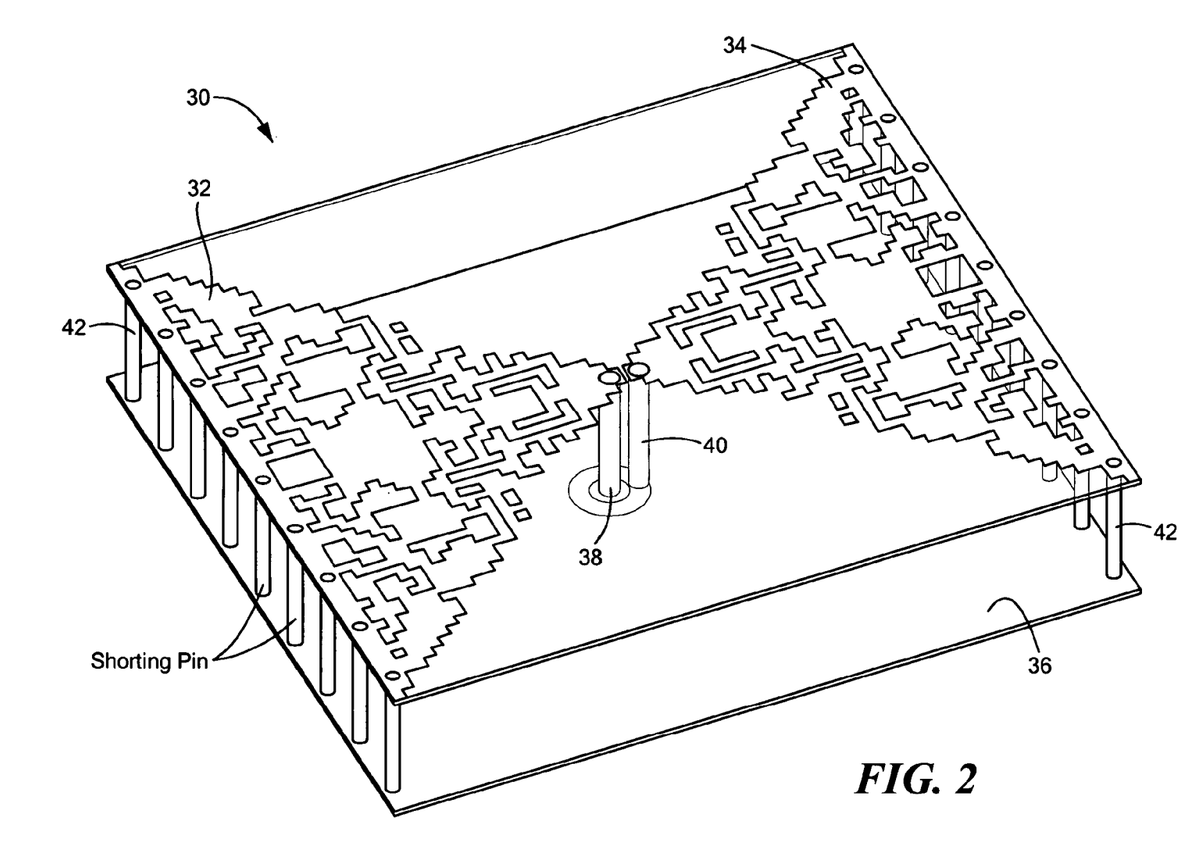
FIGS. 2 and 3 illustrate an exemplary optimized pixelated bowtie antenna in accordance with an embodiment.
Figure 3:
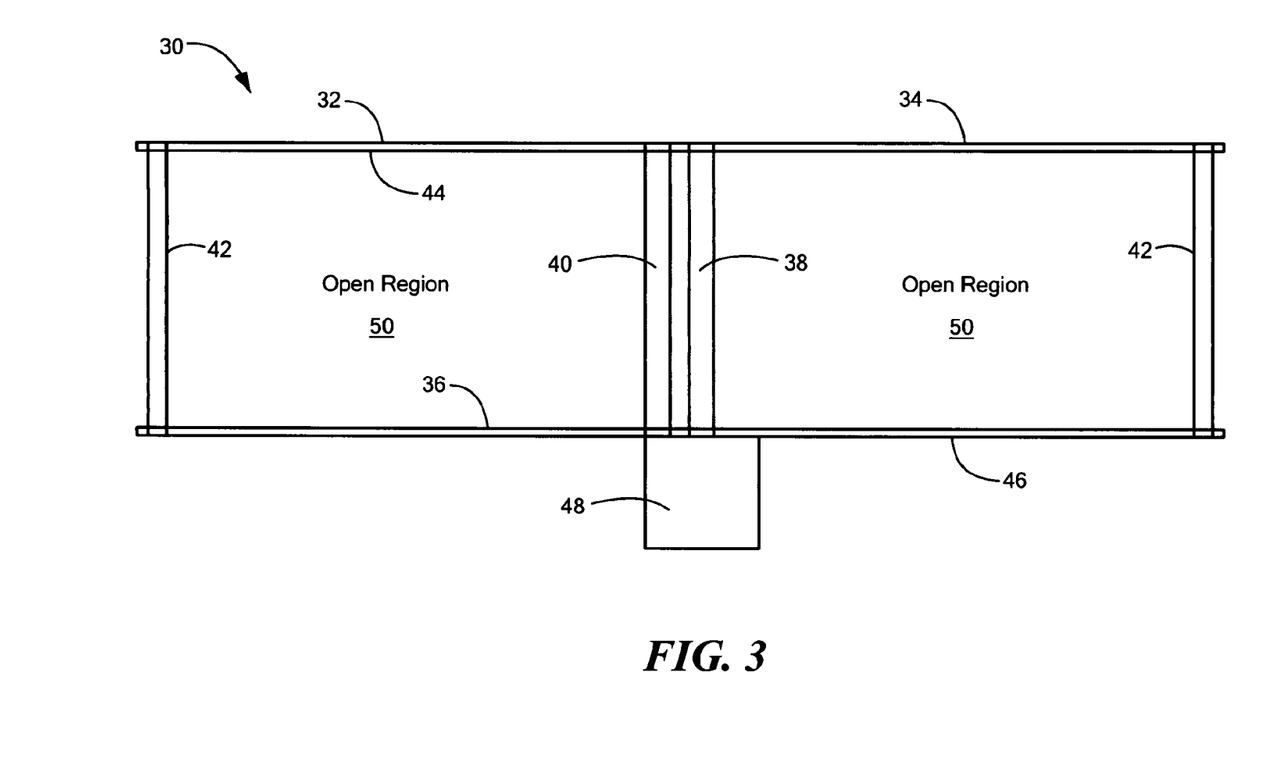

FIG. 2 is a diagram illustrating an assembled optimized pixelated bowtie antenna 30. As shown, the antenna 30 includes first and second optimized pixelated bowtie metallization regions 32, 34 spaced above a ground plane 36. A feed 38 is coupled to the first optimized bowtie region 32 and a ground pin 40 is coupled to the second optimized bowtie region 34 near a central point of the antenna 30. In addition, a plurality of shorting pins 42 are used to couple outer edges of the optimized bowtie regions 32, 34 to the ground plane. Instead of shorting pins, a shorting wall or other shorting structure may also be used. FIG. 3 is a cross-sectional side view of the antenna 30 of FIG. 2. As shown, the first and second optimized pixelated bowtie regions 32, 34 may be implemented upon a first dielectric board material 44 and the ground plane 36 may be implemented upon a second dielectric board material 46. A feed connector 48 may be used to feed the antenna 30. Because dielectric boards are used to carry the bowtie members and the ground plane, an open space 50 is defined within the antenna 30 between the bowtie regions 32, 34 and the ground plane 36.

Figure 4:
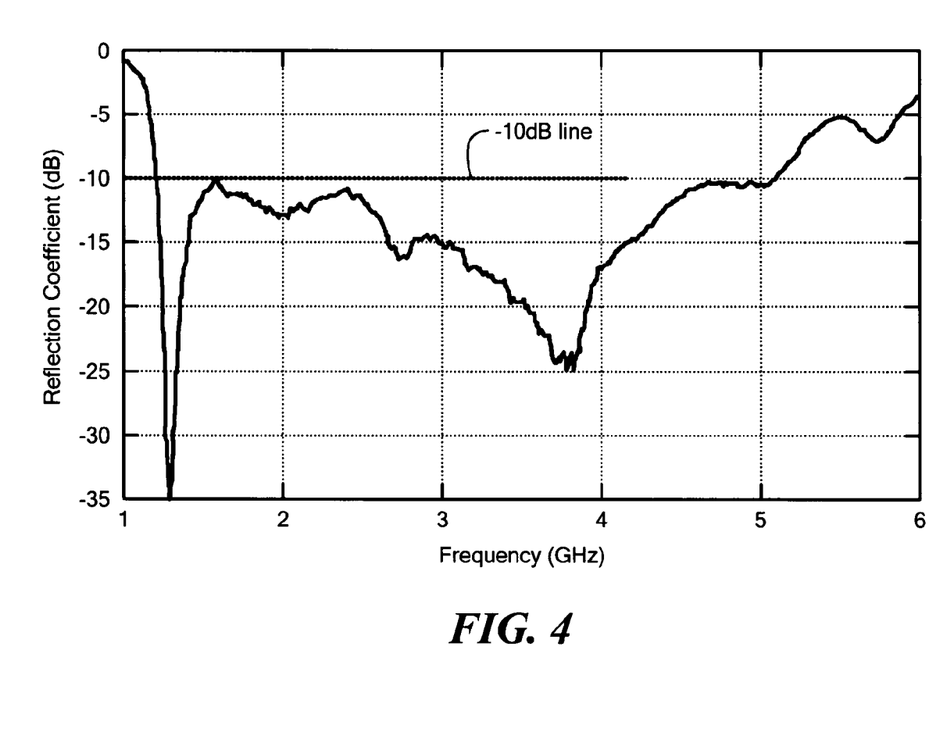
FIG. 4 is a plot of reflection coefficient versus frequency for the exemplary optimized antenna of FIGS. 2 and 3.

In at least one implementation, an optimized pixelated bowtie antenna similar to antenna 30 of FIGS. 2 and 3 was designed that is operative within a band extending from 1.2 GHz to 5.2 GHz. This corresponds to a bandwidth of 4.3:1 for an antenna that is less than ⅕ wavelength (λ/5) in size at 1.2 GHz. In this example, the operational band of the antenna is defined as the frequency band within which the reflection coefficient of the antenna is below −10 dB (i.e., the band edges are the frequencies at which the reflection coefficient transitions above −10 dB). FIG. 4 is a plot of reflection coefficient versus frequency for the exemplary optimized antenna described above.

Figure 5:
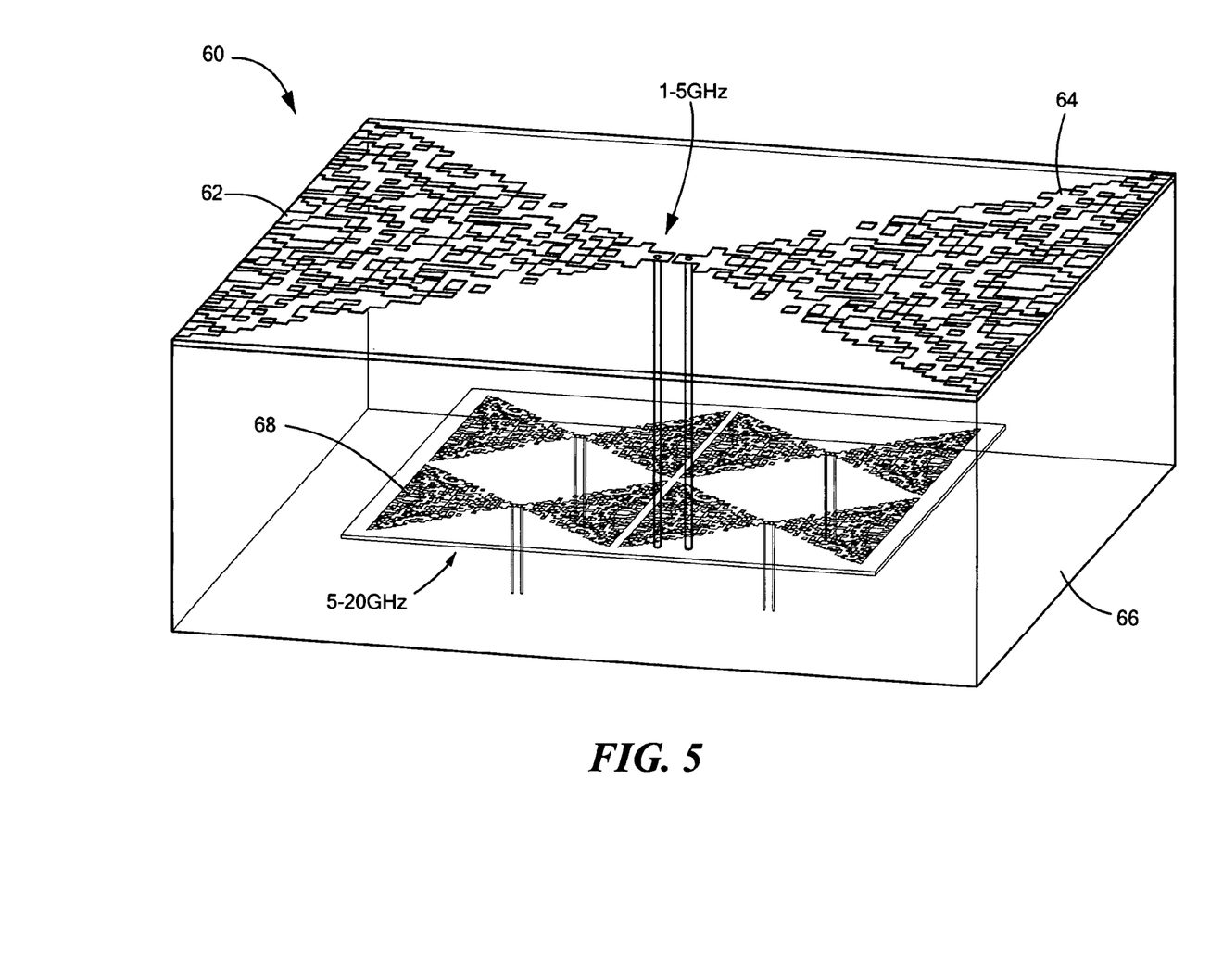
FIG. 5 is a diagram illustrating an exemplary multilevel optimized pixelated antenna in accordance with an embodiment.

In at least one embodiment, to achieve an even wider band of operation, a multilevel pixelated antenna approach is implemented in which one or more pixelated radiating surfaces are implemented within the outer boundaries of another pixelated antenna (e.g., in the open region between the radiating surface and the ground plane of the other antenna). FIG. 5 is a diagram illustrating an exemplary multilevel antenna 60 in accordance with an embodiment. As shown, the antenna 60 includes optimized pixelated bowtie radiating surfaces 62, 64 on an upper level thereof with an underlying ground plane 66 as in the antenna 30 of FIG. 2. However, the antenna 60 further includes an array of higher frequency pixelated bowtie radiators 68 on an intermediate level between the upper level and the ground plane 66. The ground plane 66 may serve as a ground plane for radiators on both the upper level and the intermediate level.

In at least one implementation, the radiators 68 on the intermediate level can be a scaled version of the bowtie on the upper level. That is, for example, the antenna having bowtie radiating surfaces 62, 64, which is operative within a frequency range between 1 GHz and 5 GHz, can be scaled down by a factor of 4 to achieve bowtie radiators operative within a frequency range between 5 GHz and 20 GHz. Because the scaled down antenna is significantly smaller, multiple of these antennas may be implemented on the intermediate level of the larger antenna without increasing the overall size of the antenna. In some embodiments, however, only a single antenna is implemented on the intermediate level. In fact, any number of antennas may be implemented on the intermediate level in different implementations if space permits.

As described above, in some implementations, the radiator(s) on the intermediate level is a scaled version of the radiator on the upper level. However, in some embodiments, further refinement may be used to overcome, for example, mutual coupling effects between the two levels. For example, in one approach, an in situ re-optimization of the pixel geometry on each level may be performed to overcome mutual coupling and/or other effects between levels.

In some embodiments, a multi-level antenna design as shown in FIG. 5 may have multiple different modes of operation. For example, such an antenna may be operated within a single band mode or a multi-band mode. In multi-band mode, a controller may switch between the feeds of the different levels when operation within either the band associated with the upper level (1 GHz-5 GHz) or operation within the band associated with the intermediate level (5 GHz-20 GHz) is desired. In single band mode, a controller may multiplex the feeds from both levels together to create an instantaneous ultra-wideband response. For example, in the multi-level antenna 60 of FIG. 5, diplexing the feeds from the two levels would produce an instantaneous bandwidth of 1 GHz to 20 GHz.

In the exemplary multi-level antenna 60 of FIG. 5, two different levels are provided. This same approach can be extended to included three or more different levels within a single antenna. For example, in one possible implementation, the bowtie on the upper level of antenna 60 of FIG. 5 could be scaled up by a factor of four to achieve a larger antenna operative in the frequency range of 300 MHz to 1.2 GHz. Four antennas 60 of FIG. 5 could then be implemented below the new lower frequency radiator to achieve an overall bandwidth for the 3 level structure from 300 MHz to 20 GHz. The number of levels may be further increased to achieve even larger operational bandwidths. As described above, an in situ re-optimization may be performed for the 3 (or more) level antenna to overcome mutual coupling and/or other effects between levels. The total dimensions of a multi-level antenna system will typically be determined by the lowest frequency of operation. For example, in the two level embodiment of FIG. 5, the lowest frequency is 1 GHz and the entire antenna fits in a box with dimensions less than 49 mm by 49 mm by 13 mm. This corresponds to roughly $\lambda/5$ by $\lambda/5$ by $\lambda/23$ at 1 GHz and represents a very small antenna in terms of size-bandwidth ratio.

In the multi-level antenna embodiments described above, all radiating surfaces are pixelated and optimized. In some other embodiments, however, multi-level antennas are provided that include one or more radiating surfaces that are not pixelated or optimized. For example, in the antenna 60 of FIG. 5, instead of four optimized bowties 68 on the intermediate level, a single non-pixelated bowtie may be used. This single non-pixelated bowtie may, for example, have an operational frequency band with a lower band edge at 5 GHZ. Because of the higher frequency, the non-optimized element could still fit within the outer boundaries of the bowtie 62, 64 on the upper level.

In the multi-level antenna embodiments described above, the radiators on the intermediate level(s) are the same type of radiator as the ones on the upper level (i.e., bowties). In some other embodiments, multi-level antennas are provided that use different types of radiators on the various levels. For example, a bowtie could be used on the upper level and one or more dipoles or patches could be used on an intermediate level. Other configurations are also possible.

Figure 6:
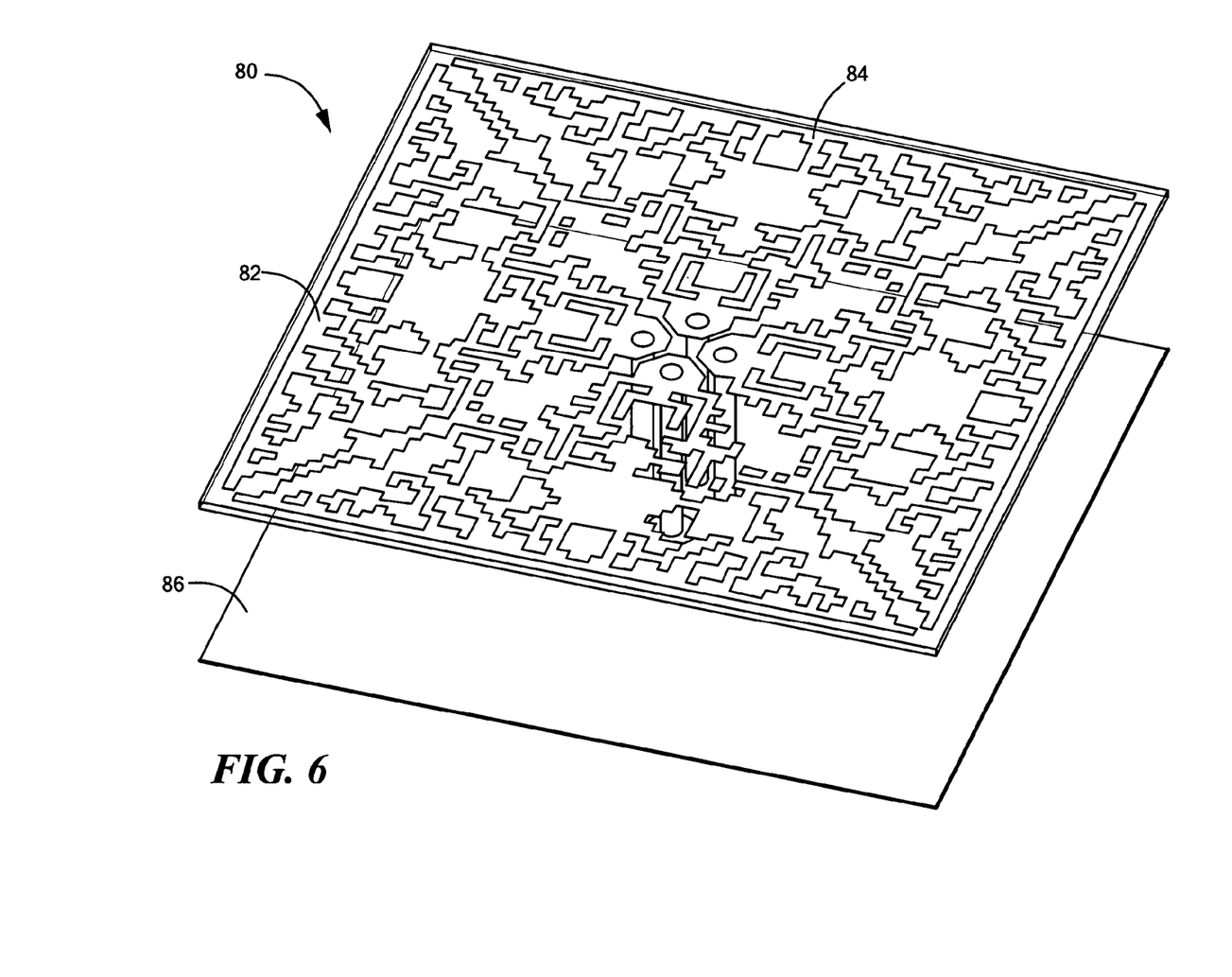
FIG. 6 is a diagram illustrating an exemplary single level optimized pixelated antenna that is capable of providing multiple polarization modes in accordance with an embodiment.

In some embodiments, reconfigurable antennas are provided that are capable of switching between different polarizations during antenna operation. In this manner, the antennas can be used in systems that implement polarization diversity. FIG. 6 is a diagram illustrating an exemplary single level optimized pixelated antenna 80 that is capable of providing multiple polarization modes in accordance with an embodiment. As shown, the antenna 80 includes two bowtie radiators 82, 84 arranged orthogonally to one another on a single metallization layer above a ground plane 86. At any particular time, a controller may select either vertical, horizontal, or circular polarization for this antenna and use the corresponding antenna feeds to achieve transmission or reception. One bowtie can be used to achieve vertical polarization and the other can be used to achieve horizontal polarization. For circular polarization, the controller may combine the feeds of both bowties 82, 84 using a 90 degree phase shift for one of the feeds (depending on whether right hand or left hand circular polarization is desired). In one approach, circular polarization may be achieved using a pair of 90 degree hybrids and corresponding switches. When right hand circular polarization is desired, one of the hybrids may be switched into the circuit and when left hand circular polarization is desired, the other hybrid may be switched into the circuit. Other hardware based techniques for achieving circular polarization may alternatively be used. Circular polarization may also be achieved using digital processing.

The polarization diversity approach illustrated in FIG. 6 may be extended to multi-level designs to create ultra-wideband antennas with polarization diversity. For example, one or more higher frequency intermediate levels may be added to the antenna 80 of FIG. 6 with each level having one or more multi-polarization radiating structures like the one shown (i.e., two orthogonal, pixelated, optimized bowties). Each level would then be capable of polarization diversity and a single wideband response could be achieved at any polarization. Again, any number of levels could be used to achieve a desired instantaneous bandwidth. Also, in situ optimization could be used to re-optimize the various levels to overcome mutual coupling and/or other inter-level effects.

In the embodiments described above, various antenna structures and technique are provided for achieving wide bandwidth operation from a relatively small antenna. It may not always be desirable, however, to operate over the full operational bandwidth of such an antenna. That is, in many applications, it may be preferable to operate over a narrower frequency band or multiple narrower bands. As described previously, in some embodiments, a multi-level antenna may be operated within either a single band mode or a multi-band mode. That is, the antenna may be operated using the bands associated with the various levels individually or it may multiplex the feeds together to form a single wide instantaneous bandwidth. In some embodiments, however, antennas are provided that are capable of being reconfigured and re-optimized in the field for use in different frequency band scenarios. To enable users to electronically reconfigure pixelated radiating surfaces in real time to produce one or more desired frequency responses, various reconfiguration structures/techniques have been developed.

Figure 7A:
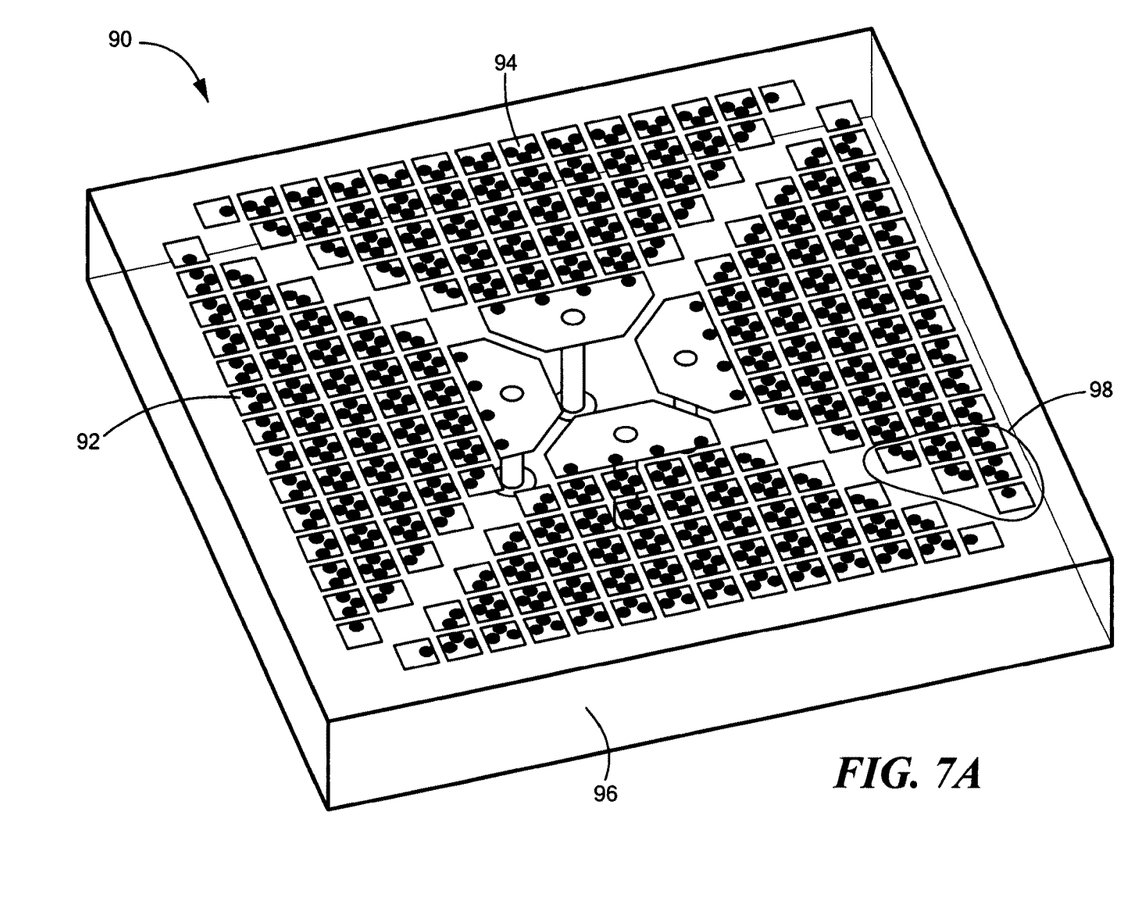
FIGS. 7A and 7B are diagrams illustrating an exemplary switch-based reconfigurable pixelated antenna structure that may be used to provide real time reconfiguration in accordance with an embodiment.
Figure 7B:
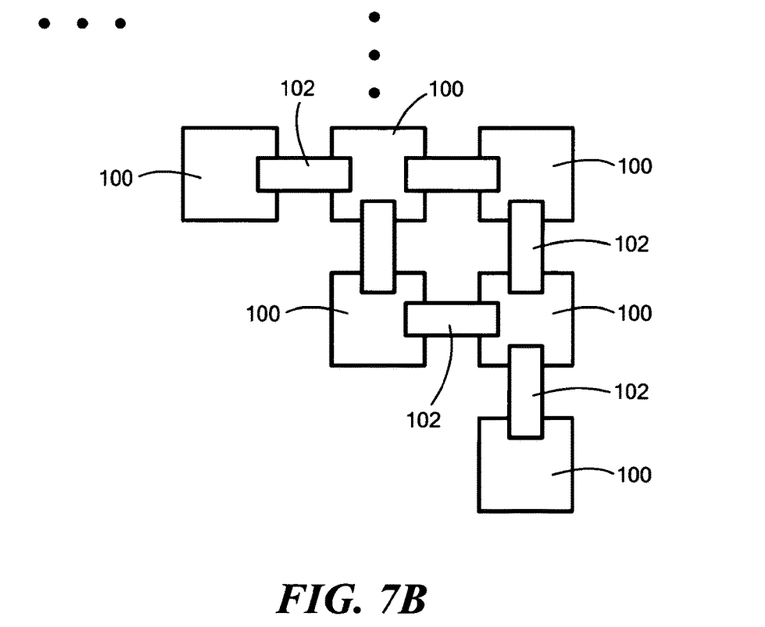

FIGS. 7A and 7B are diagrams illustrating an exemplary switch-based reconfigurable pixelated antenna structure 90 that may be used to provide real time reconfiguration of pixelated radiating surfaces in accordance with an embodiment. As illustrated, the antenna structure 90 includes two orthogonal pixelated bowtie radiators 92, 94 disposed above a ground plane 96. However, instead of having static optimized pixelated radiating surfaces, the bowtie radiators 92, 94 include a plurality of low-loss ultrawideband switching devices coupled between pixel elements that allow a wide variety of different pixel geometries to be achieved. In this manner, the antenna structure 90 may be reconfigured in the field for optimal operation in different desired frequency bands. If a relatively narrow frequency band is desired, the pixel geometry may be reconfigured to provide optimal performance within that narrow band. This may enable, for example, a better reflection coefficient to be achieved over the narrow band than would be available in this band if the antenna was optimized for a much wider bandwidth. The ability to switch from wideband to narrow band may be preferred (or even ideal) for operations in noisy environments among other things. If wider band operation is desired, the pixel geometry may be reconfigured to provide optimal performance over a wide bandwidth (such as in the antenna of FIG. 5).

FIG. 7B is a close up view of a portion 98 of bowtie radiator 92 of FIG. 7A. As shown, a plurality of switching devices 102 are provided to controllably interconnect a plurality of pixel elements 100. The switching devices 102 can be individually turned on and off by a controller. The controller can thus achieve a wide variety of different pixel geometries by turning on different sub-groups of switching devices 102. Any type of switching devices 102 may be used, including both transistors and diodes, provided they are capable of providing the switching speed and operational bandwidth required to support desired applications. In at least one embodiment, pneumatically actuated liquid metal switches are used for the switching devices 102. Other types of devices that may be used include but are not limited to MEMS switches, transistors, pin diodes, high resistive silicone switches, varactors, and/or others. By isolating the pixels and interconnecting them with switching devices, the task of finding pixel configurations through computer simulation is reduced to finding switching configurations in real time that interconnect the appropriate pixels to create antenna geometries with desired electrical responses.

Although the antenna structure 90 of FIGS. 7A and 7B uses specific types of radiating elements and a specific number of pixel elements per radiating surface, it should be appreciated that these attributes are not intended to be limiting. That is, this approach to providing a reconfigurable antenna structure may be used with any type of planar or conformal radiating element. In addition, any number of pixels may be used in different implementations. The more pixels that are used in a particular implementation, the greater the number of pixel geometries that are available. However, a greater number of pixels may involve a larger amount of computational complexity to find optimal geometries. The features illustrated in FIGS. 7A and 7B may be extended to multi-level antennas to achieve an antenna that is reconfigurable on multiple different levels and over an extended bandwidth range.

Figure 8A:
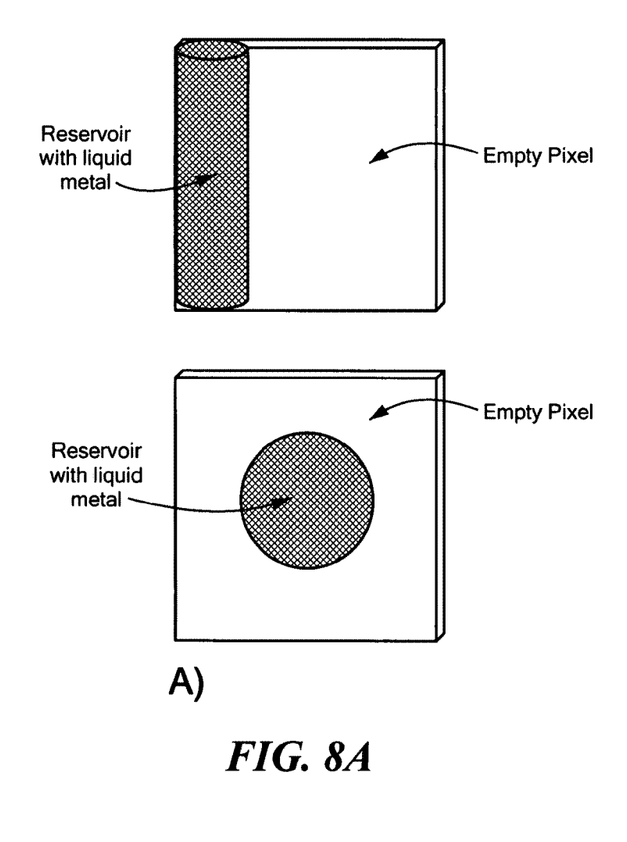
FIGS. 8A and 8B are diagrams illustrating an exemplary liquid metal-based reconfigurable pixelated antenna structure that may be used to provide real time reconfiguration in accordance with an embodiment.
Figure 8B:
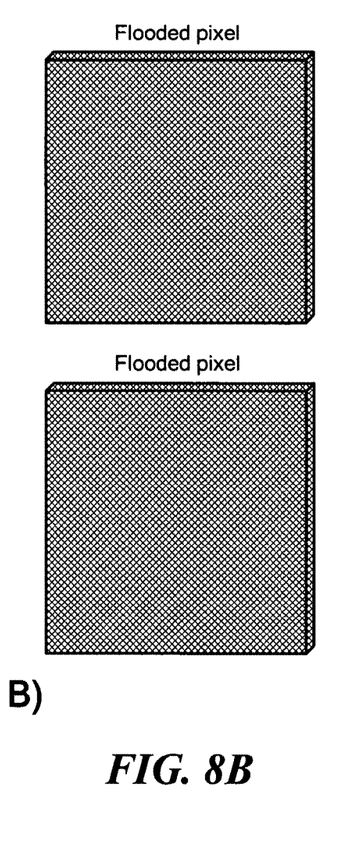

FIGS. 8A and 8B illustrate another exemplary technique for achieving a reconfigurable pixelated antenna structure in accordance with an embodiment. In this technique, a liquid metal material is used to provide controllable pixels for a radiating surface of an antenna. As shown in FIG. 8A, a reservoir of liquid metal is provided in close proximity to a pixel chamber. The pixel is "activated" by applying pressure to the corresponding reservoir, thereby forcing the liquid metal into the pixel chamber, as shown in FIG. 8B. When the pixel is not part of a present pixel geometry, the liquid metal remains in the reservoir. Conductive interconnects may be provided between adjacent pixel chambers to provided electrical continuity between pixels that are currently active (i.e., filled with liquid metal). In at least one embodiment, galinstan is used as the liquid metal. Other liquid metals such as mercury and gallium/indium, conductive liquids or gel-based materials may alternatively be used. This approach may be used in single level and multi-level antennas and may be used with any type of planar or conformal radiating surface. This technique may also be used in multi-polarization antennas such as antenna 80 of FIG. 6.

Either of the above-described approaches may be used to provide an antenna that is reconfigurable in the field to provide optimal operation within different desired frequency band scenarios. In some embodiments, antennas are provided that utilize both of these techniques. For example, in one embodiment, a multi-level antenna may be provided that uses a switch-based reconfiguration approach (as shown in FIGS. 7A and 7B) on an upper level and a liquid metal approach (as shown in FIGS. 8A and 8B) on one or more intermediate levels. Other combinations may also be made.

Figure 9:
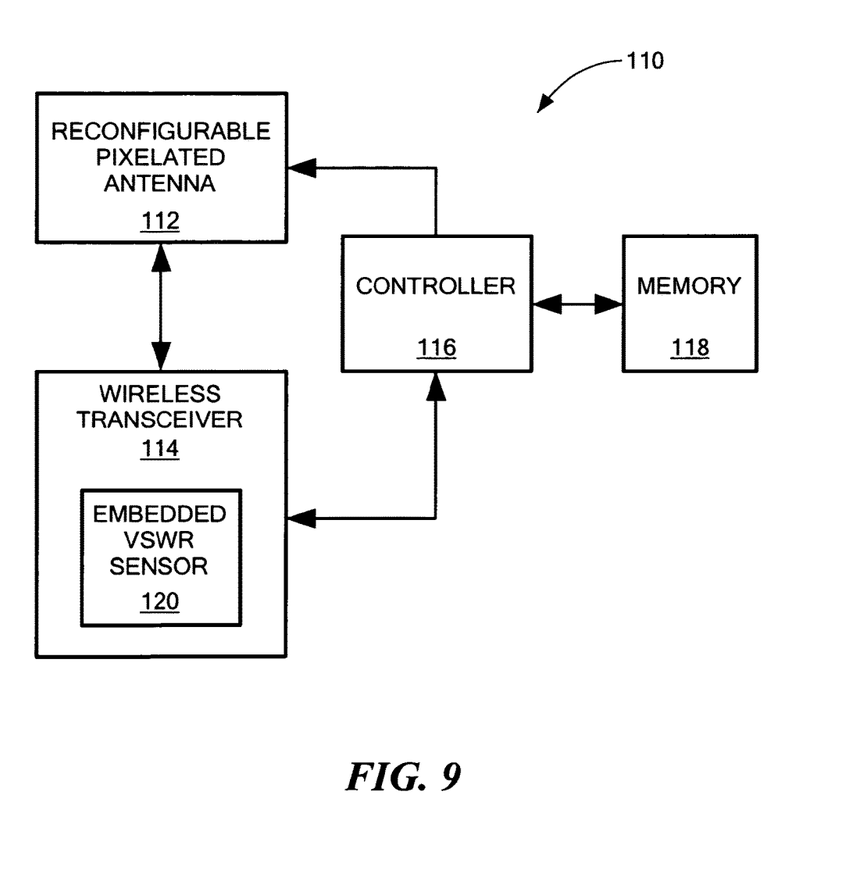
FIG. 9 is a block diagram illustrating an exemplary wireless communication device having a reconfigurable antenna system in accordance with an embodiment.

FIG. 9 is a block diagram illustrating an exemplary wireless communication device 110 having a reconfigurable antenna system in accordance with an embodiment. As illustrated, the wireless communication device 110 may include: a reconfigurable pixelated antenna system 112, a wireless transceiver 114, a controller 116, and memory 118. The reconfigurable pixelated antenna system 112 may include any of the reconfigurable antenna structures and variations described above, including both single level and multi-level antennas. The wireless transceiver 114 may include any device having transmit functionality for generating radio frequency (RF) signals for transmission from the device 110 via antenna 112 and receive functionality for processing signals received from an exterior wireless channel via antenna 112. The controller 116 may be operative for, among other things, reconfiguring the reconfigurable pixelated antenna system 112 in real time or near real time to achieve one or more desired antenna responses. The controller 116 may include one or more digital processing devices to perform the control function. The digital processing device(s) may include one or more of, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, and/or others, including combinations of the above. Memory 118 is operative for storing one or more of: an operating system of controller 116, one or more application programs of controller 116, and/or user data for controller 116. Memory 118 may include any type of device, or combination of devices, capable of storing digital data.

As described above, the controller 116 may be operative for reconfiguring the reconfigurable pixelated antenna system 112 in real time or near real time to achieve one or more desired antenna responses. The controller 116 may, for example, be capable of re-configuring the antenna system 112 to operate with different polarizations during different time periods. Likewise, the controller 116 may be capable of modifying the pixel geometry of one or more radiating surfaces of the antenna system 112 to optimize a frequency response of one or more corresponding antenna elements. For example, if the switch-based reconfiguration approach of FIGS. 7A and 7B is being used, the controller 116 may be programmed to activate appropriate switches to achieve one or more desired optimized pixel geometries. Similarly, if the liquid metal-based reconfiguration approach of FIGS. 8A and 8B is being used, the controller 116 may be programmed to apply pressure to certain liquid reservoirs of the antenna to achieve one or more desired optimized pixel geometries. If a multi-level antenna is being used, the controller 116 may be capable of independently re-configuring pixel geometries on different levels of the antenna.

In at least one embodiment, configuration data may be stored within memory 118 that corresponds to one or more different antenna pixel geometries that may be desired during operation of the communication device 110. For example, one configuration file may include switching data (or liquid metal pixel activation data) for achieving a widest possible bandwidth in the antenna 112. Other data files may be stored for achieving optimized narrower bandwidth operation. The controller 116 may first determine which antenna response is currently desired and then retrieve corresponding configuration data from memory 118. The retrieved configuration data may then be used to configure the antenna 112.

If a multi-level antenna is being used, the controller 116 may also be programmed to configure the antenna 112 to operate in either single band or multiband mode. As described previously, in multi-band mode, the controller 112 may switch between the feeds of the different levels when operation within either the band associated with the upper level or operation within the band associated with an intermediate level is desired. In single band mode, the controller 112 may multiplex the feeds from multiple levels together to create a wide instantaneous bandwidth.

In addition to the functions described above, the controller 116 may also provide control to the wireless transceiver 114 during operation of the wireless communication device 110. For example, when a new application is initiated, the controller 116 may first reconfigure the antenna 112 to operate with the new application. When the reconfiguration is complete, the controller 116 may signal the transceiver 114 that transmission and/or reception can now commence for the new application. Alternatively, the controller 116 may instruct the transceiver 114 when to transmit and/or receive for the new application.

In some embodiments, the wireless communication device 110 may be capable of determining new pixel geometries and/or configuration data for the reconfigurable antenna 112 in the field to achieve new antenna responses. For example, in one embodiment, as shown in FIG. 9, the wireless transceiver 114 may include an embedded voltage standing wave ratio (VSWR) sensor 120 for use in developing configuration data for antenna 112. The VSWR sensor 120 may form a feedback control loop with the controller 116 for use in developing configuration data for the antenna 112 to achieve one or more desired responses. The controller 112 may iterate through, for example, a number of different pixel geometries for the antenna 112 and send corresponding configuration data to the antenna 112. In each case, the controller 112 may cause the transceiver 114 to deliver one or more transmit signals (e.g., a series of signals having different frequencies, a single signal having a swept frequency, etc.) to the antenna 112 and corresponding VSWR values may be measured by the sensor 120. The VSWR values may then be fed back to the controller 116 for use in selecting a pixel geometry to achieve the desired response. After the pixel geometry has been selected, the corresponding configuration data may be stored in the memory 118. Any of a number of different optimization techniques may be used by controller 116 for quickly finding an optimized pixel geometry to provide a desired response. In at least one embodiment, a genetic algorithm is used to find a desired pixel geometry, although other techniques may alternatively be used.

The above-described technique for determining a new pixel geometry for a reconfigurable antenna may be used to, for example, optimize the antenna for use with a new or different application or frequency range. The technique may also, or alternatively, be used to provide a self-healing capability for the antenna for use in cases where one or more component failures have affected the antenna's ability to achieve one or more previously determined optimized responses. For example, one or more switch failures in an antenna may compromise the antenna's ability to achieve an optimal response across a wide bandwidth. A system having self-healing capability would be able to detect the defective condition and, in response, determine a new pixel configuration for the antenna for achieving the desired response. This self-healing capability can also be used to compensate for detuning effects other than component failures (e.g., component aging, effects caused by moisture absorption, etc.).

Although shown as part of the wireless transceiver 114 in FIG. 9, it should be appreciated that the VSWR sensor 120 may alternatively be part of the antenna 112 or a separate sensor unit may be provided between the transceiver 114 and the antenna 112. Other types of sensors may be used as an alternative to, or in addition to, the VSWR sensor 120 of FIG. 9.

As used herein, the terms "optimal," optimized," and the like do not necessarily refer to the best possible configuration of an antenna to achieve a desired goal over all possible configurations, but can refer to the best configuration that was found during an optimization procedure given certain limits of the procedure. For example, there may be a time limit placed upon a search for an optimized pixel geometry to produce a particular response. In this case, an optimized or optimal pixel geometry may be a geometry that was found during the time limited search. In another optimization technique, an optimization procedure may continue until a predetermined performance level has been achieved. In this case, an optimal pixel geometry may be a final geometry which achieved the predetermined performance level. As stated previously, the number of possible pixel geometries in some implementations can be very large (e.g., $p^N$). It may be impossible to check every possible geometry to find the one that performs "best" at achieving a desired design goal.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An antenna system comprising:
   a first pixelated radiating element on a first level;
   one or more second pixelated radiating elements on a second level, the second level being different from the first level; and
   a ground plane located below the first and second levels, the ground plane serving as a ground plane for radiating elements on both the first level and the second level, wherein the one or more second pixelated radiating elements fit within an outer boundary of the first pixelated radiating element projected onto the second level;
   wherein:
      the first pixelated radiating element includes a plurality of adjustable pixels that can each be individually changed between multiple pixel states in response to one or more control signals; and
      each of the second pixelated radiating elements includes a plurality of adjustable pixels that can each be individually changed between multiple pixel states in response to one or more control signals.

2. An antenna system comprising:
   a first pixelated radiating element on a first level;
   one or more second pixelated radiating elements on a second level, the second level being different from the first level;

a ground plane located below the first and second levels, the ground plane serving as a ground plane for radiating elements on both the first level and the second level; and one or more third pixelated radiating elements on a third level, the third level being between the second level and the ground plane, wherein each third pixelated radiating element is operative in a third frequency range that is higher than the second frequency range;

wherein the one or more second pixelated radiating elements fit within an outer boundary of the first pixelated radiating element projected onto the second level;

the second level is between the first level and the ground plane;

the first pixelated radiating element is operative in a first frequency range; and each second pixelated radiating element is operative in a second frequency range that is higher than the first frequency range.

3. The antenna system of claim 2, further comprising:

a controller configured to multiplex feeds associated with the first and second pixelated radiating elements together to achieve a single wideband instantaneous bandwidth for the antenna system that is a combination of the first and second frequency ranges.

4. The antenna system of claim 3, wherein:

the controller is configured to dynamically select a frequency mode for the antenna system from a group of frequency modes, wherein the group of frequency modes includes at least two of: a mode operative in the first frequency range, a mode operative in the second frequency range, and a mode operative in a wideband frequency range achieved by multiplexing feeds of the first and second pixelated radiating elements together.

5. The antenna system of claim 2, wherein:

the upper band edge of the first frequency range is approximately the same as the lower band edge of the second frequency range.

6. The antenna system of claim 2, wherein:

the first pixelated radiating element is optimized to achieve small size and wide bandwidth; and the one or more second pixelated radiating elements are scaled versions of the first pixelated radiating element.

7. An antenna system comprising:

a first pixelated radiating element on a first level;

one or more second pixelated radiating elements on a second level, the second level being different from the first level;

a ground plane located below the first and second levels, the ground plane serving as a ground plane for radiating elements on both the first level and the second level; and a third pixelated radiating element on the first level that is orthogonally oriented with respect to the first pixelated radiating element.

8. The antenna system of claim 7, further comprising:

one or more fourth pixelated radiating elements on the second level, wherein each of the fourth pixelated radiating elements is orthogonally oriented with respect to a corresponding second pixelated radiating element.

9. The antenna system of claim 8, further comprising:

a controller to select one of multiple polarization modes for the antenna system and to couple feeds of radiating elements on the first and second levels in a manner that supports the selected polarization mode, wherein the multiple polarization modes include at least two of: a vertical polarization mode, a horizontal polarization mode, a left hand circular polarization mode, and a right hand circular polarization mode.

10. An antenna system comprising:

a first pixelated radiating element on a first level;

one or more second pixelated radiating elements on a second level, the second level being different from the first level; and a ground plane located below the first and second levels, the ground plane serving as a ground plane for radiating elements on both the first level and the second level;

wherein the first pixelated radiating element includes a plurality of adjustable pixels that can each be individually changed between multiple pixel states in response to one or more control signals;

each of the second pixelated radiating elements includes a plurality of adjustable pixels that can each be individually changed between multiple pixel states in response to one or more control signals; and the antenna system further comprises a controller configured to: (a) provide control signals to the adjustable pixels of the first pixelated radiating element to modify a response of the first pixelated radiating element and (b) provide control signals to the adjustable pixels of the second pixelated radiating elements to modify responses of the second pixelated radiating elements.

11. The antenna system of claim 10, wherein:

the controller is configured to adapt a pixel geometry of the first pixelated radiating element and a pixel geometry of the at least one second pixelated radiating element based on requirements of one or more applications currently being performed by the antenna, wherein the applications being performed can change with time.

12. The antenna system of claim 10, wherein:

at least one of the pixelated radiating elements on the first and second levels includes one or more adjustable pixels having a conductive pixel element and a plurality of electronic switching devices coupled between the conductive pixel element and conductive pixel elements associated with adjacent adjustable pixels.

13. The antenna system of claim 10, wherein:

at least one of the pixelated radiating elements on the first and second levels includes one or more adjustable pixels having a reservoir of a liquid conductive material coupled to a pixel chamber, wherein the adjustable pixel is activated by applying pressure to the reservoir to force the liquid conductive material into the pixel chamber.

14. The antenna system of claim 10, wherein:

the controller is configured to adjust pixel geometries of pixelated radiating elements on the first and second levels to achieve optimized operation within a selected one of: a single narrow frequency band, multiple frequency bands, or a single wide frequency band.

15. The antenna system of claim 10, further comprising:

at least one sensor to measure a performance metric of the antenna; and a controller configured to determine new pixel geometries for the first and second pixelated radiating elements in the field based at least in part on readings of the at least one sensor.

16. An antenna system comprising:

a first pixelated radiating element on a first level, the first pixelated radiating element having a plurality of adjustable pixels that can each be individually changed between multiple pixel states in response to one or more control signals;

at least one second pixelated radiating element on a second level, the at least one second pixelated radiating element having a plurality of adjustable pixels that can each be individually changed between multiple pixel states in response to one or more control signals; and a ground plane located below the first and second levels, the ground plane serving as a ground plane for radiating elements on both the first level and the second level, the second level being located between the first level and the ground plane, wherein the at least one second pixelated radiating element fits within an outer boundary of the first pixelated radiating element projected onto the second level.

17. The antenna system of claim 16, further comprising:
a controller configured to determine new pixel geometries for one or more of the first pixelated radiating element and the at least one second pixelated radiating element in the field to support optimized operation within one or more frequency ranges not currently supported by the antenna system.

18. The antenna system of claim 16, further comprising a controller configured to:
identify a degraded response of one or more of the first and second pixelated radiating elements during antenna operation; and
determine a new pixel geometry for each radiating element having a degraded response to improve the response of the radiating element.

19. The antenna system of claim 16, wherein:
the adjustable pixels of the first and second pixelated radiating elements include at least one adjustable pixel having a conductive pixel element and a plurality of electronic switching devices coupled between the conductive pixel element and conductive pixel elements associated with adjacent adjustable pixels.

20. The antenna system of claim 16, wherein:
the adjustable pixels of the first and second pixelated radiating elements include at least one adjustable pixel having a reservoir of a liquid conductive material coupled to a pixel chamber, wherein the adjustable pixel is activated by applying pressure to the reservoir to force the liquid conductive material into the pixel chamber.

21. The antenna of claim 16 further comprising at least one of a shorting pin or shorting plate for increased miniaturization.

22. The antenna of claim 16 further comprising one or more resistors disposed between the edge of the pixelated layers and the shorting pins.

23. The antenna of claim 16 further comprising a plurality of stacked pixelated layers of the same dimensions.

24. The antenna of claim 16 further comprising a layer of artificially constructed material such as a metamaterial or magnetic composite below the second pixelated layer to achieve resonance at an even lower frequency.

* * * * *